A. D. SMITH.
AUTOMATIC COUPLING FOR RAILWAY, TRAMWAY, AND SIMILAR VEHICLES.
APPLICATION FILED NOV. 15, 1912. RENEWED DEC. 8, 1913.

1,084,368.

Patented Jan. 13, 1914.

2 SHEETS—SHEET 1.

A. D. SMITH.
AUTOMATIC COUPLING FOR RAILWAY, TRAMWAY, AND SIMILAR VEHICLES.
APPLICATION FILED NOV. 15, 1912. RENEWED DEC. 8, 1913.
1,084,368.
Patented Jan. 13, 1914.
2 SHEETS—SHEET 2.
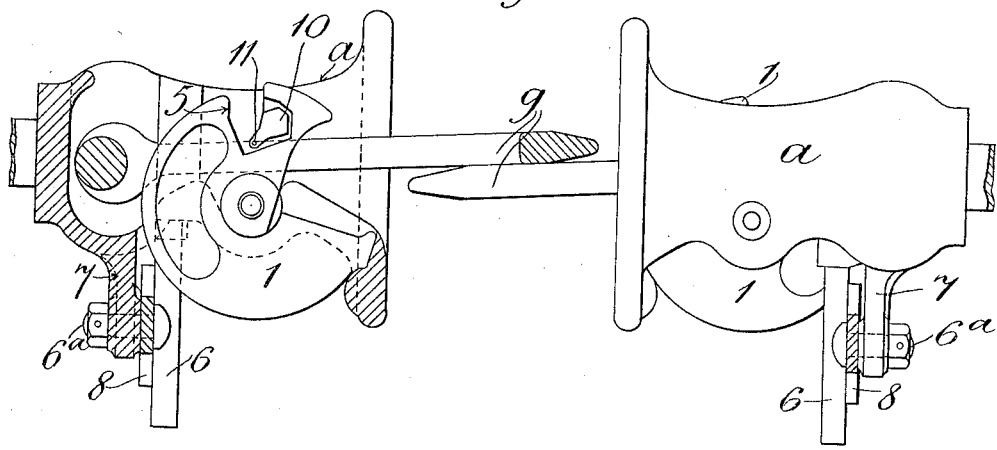
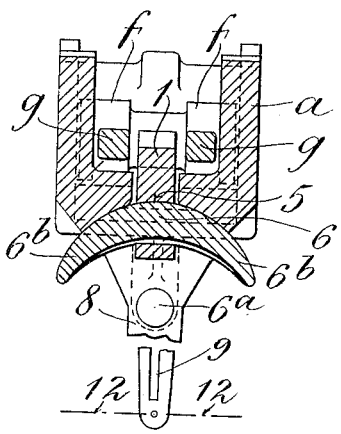
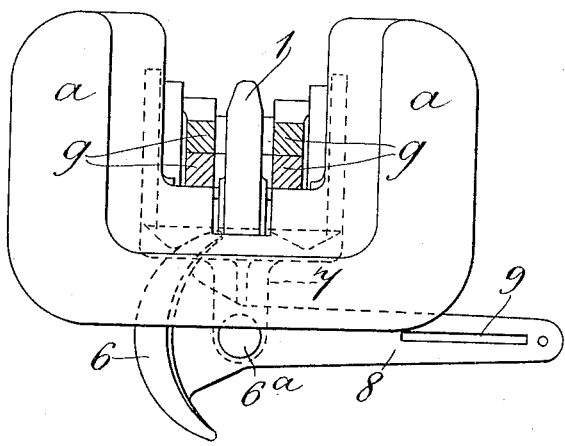

UNITED STATES PATENT OFFICE.

ALLISON DALRYMPLE SMITH, OF EDINBURGH, SCOTLAND.

AUTOMATIC COUPLING FOR RAILWAY, TRAMWAY, AND SIMILAR VEHICLES.

1,084,368. Specification of Letters Patent. Patented Jan. 13, 1914.

Application filed November 15, 1912, Serial No. 731,548. Renewed December 8, 1913. Serial No. 805,432.

*To all whom it may concern:*

Be it known that I, ALLISON DALRYMPLE SMITH, a subject of the King of Great Britain and Ireland, residing at Edinburgh, Scotland, have invented Improvements in Automatic Couplings for Railway, Tramway, and Similar Vehicles, of which the following is a specification.

This invention relates to automatic couplings for railway, tramway and similar vehicles of the type comprising a central buffer head, a coupling link pivoted to the said head, and a disk hook with which the coupling link of an adjacent vehicle can engage, the said link turning the said disk hook while in the act of coupling until a locking bolt engages with the disk hook and holds the same in a locked position. To uncouple, the locking bolt is withdrawn and on the vehicles moving apart the link turns the disk hook into its uncoupled position.

According to this invention the locking bolt is constituted by a crescent shaped member arranged to rock about a pivot in a plane at right angles to the plane of the disk, the pivot hole being of such size and shape as to enable the member to move relatively to the pivot whereby the ready and certain engagement of the member with the disk hook is facilitated owing to the consequent freedom with which the member can swing about its pivot, and the member, when engaging the hook can be moved thereby toward and bear against the coupling head so that the pivot will not be subjected to the pulling strain.

Figure 1:
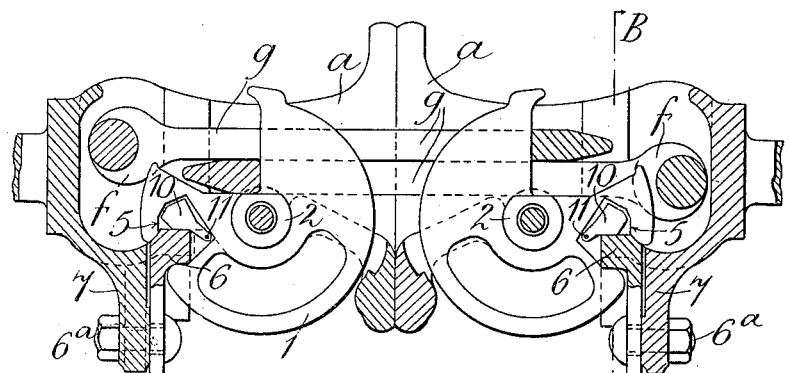
Figure 2:
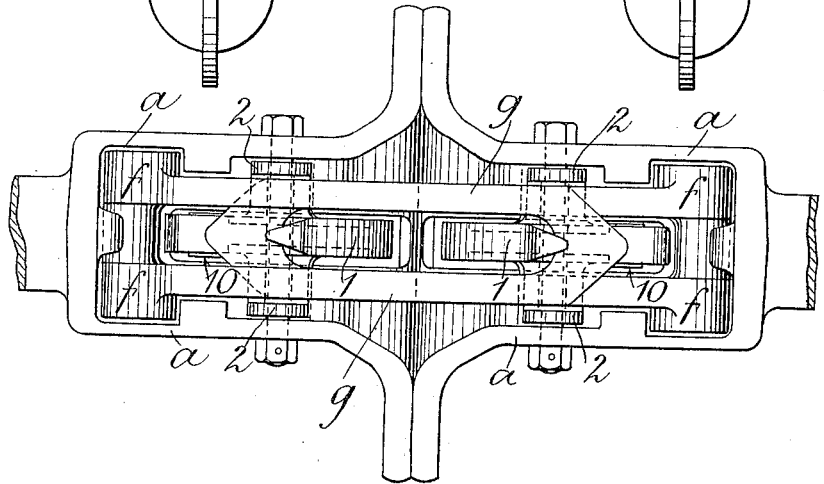

Figure 1 of the accompanying illustrative drawings shows in sectional elevation the couplings of two adjacent vehicles in engagement. Fig. 2 is a plan corresponding to Fig. 1. Fig. 3 shows the coupling out of engagement. Fig. 4 is a transverse section corresponding to the line B, B, of Fig. 1. Fig. 5 is an end elevation of one of the couplings.

$a$ is the hollow buffer head, $g$ the coupling link pivoted by trunnions $f$ in the said head, and 1 the disk hook which is mounted on trunnions 2 and is formed with a recess 5 for a locking bolt 6. In a known manner the recess 5 is provided with masking catches 10, pivoted at 11 and adapted to be moved out of the position in which they mask the notch into the position shown in Fig. 1 by one of the points or noses $6^b$ of the crescent shaped locking bolt 6 when coupling is to be effected.

The locking bolt 6 is pivoted upon a bolt or stud $6^a$ fixed in a lug 7 depending from the buffer head, and an arm 8 formed in one with or connected to the locking bolt 6 is provided with a counterweight 9 that may in known manner be formed as a semaphore disk. The pivot hole $6^c$ in the locking bolt 6 is elongated in order to permit of sufficient vertical movement to enable the bolt 6 to rise under the pull of the hook and bear against the correspondingly shaped lower part $a^1$ of the buffer head $a$ without any strain being put on the pivot $6^a$, and also to facilitate the ready engagement of the locking bolt with the hook by enabling the said locking bolt to normally hang clear of the buffer head and enter into engagement with the recess 5 of the hook without binding against the said head.

The crescent shape of the locking bolt 6 is such that engagement between it and the disk is progressive so that the locking is properly effected even when the disk hook is rotated suddenly which is frequently the case when two vehicles come together violently.

Attached to the lower end of the lever 8 is an intermediate part of a chain or cord 12 the two ends of which are led with sufficient slack to staples or the like on opposite sides of the vehicle. To uncouple, the chain or cord 12 can be pulled from either side of the vehicle so as to move the lever 8 into an approximately horizontal position as shown in Fig. 5, the effect of which is to withdraw the locking bolt 6 from engagement with the disk hook 1. Immediately the point or nose of the bolt 6 is clear of the recess 5 the shutters 10 fall by gravity so as to mask the recess. Directly the chain or cord 12 is released the said point or nose rests against the side faces of the adjacent shutter 10 and the bolt is prevented from reëntering the recess 5. At this stage the vehicles are still coupled but the couplings are not locked and upon the vehicles being drawn apart the links *g* pull upon the disk hooks 1 and rotate the same until they disengage therefrom, whereupon each disk hook continues to rotate by gravity and assumes the open or "set for coupling" position shown in Fig. 3.

What I claim is:—

1. An automatic coupling comprising a central buffer head, a coupling link pivoted to the said head, a disk hook with which the coupling link of an adjacent vehicle can engage, a crescent shaped locking bolt adapted to engage the said disk hook and prevent it turning when in operative position, and a pivot located below the coupling head and about which said locking bolt can work angularly in a plane at right angles to that of the said disk hook.

2. An automatic coupling comprising a central buffer head, a coupling link pivoted to the said head, a disk hook with which the coupling link of an adjacent vehicle can engage, a longitudinally extending pivot located below said head, and a crescent shaped locking bolt formed with a clearance hole for said pivot and adapted to engage the said disk hook and prevent it turning when engaged by the coupling link of an adjacent vehicle.

3. An automatic coupling comprising a central buffer head, a downwardly extending lug on said head, a coupling link pivoted to the said head, a disk hook trunnioned in said head, a longitudinally extending pivot fixed in said lug, and a crescent shaped locking bolt formed with a clearance hole for said pivot and adapted to engage the said disk hook and prevent it turning when engaged by the coupling link of an adjacent vehicle.

4. An automatic coupling comprising a central buffer head, a coupling link pivoted to the said head, a disk hook with which the coupling link of an adjacent vehicle can engage, a crescent shaped locking bolt adapted to engage the said disk hook and prevent it turning when in operative position, a pivot located below the coupling head and about which said locking bolt can work angularly in a plane at right angles to that of the said disk hook, and means, operable from either side of the vehicle, for releasing said locking bolt.

5. An automatic coupling comprising a central hollow buffer head, a downwardly extending lug on said head, a coupling link trunnioned in said head, a disk hook trunnioned in said head, a longitudinally extending pivot bolt fixed in said lug, a crescent shaped locking bolt adapted to engage the said disk hook and prevent it turning when engaged by the coupling link of an adjacent vehicle, and a lever formed with a clearance hole for said pivot bolt and to which said locking bolt is fixed.

6. An automatic coupling comprising a central hollow buffer head, a downwardly extending lug on said head, a coupling link trunnioned in said head, a disk hook trunnioned in said head, a longitudinally extending pivot bolt fixed in said lug, a crescent shaped locking bolt adapted to engage the said disk hook and prevent it turning when engaged by the coupling link of an adjacent vehicle, and a lever formed with a clearance hole for said pivot bolt and to which said locking bolt is fixed, and means, operable from either side of the vehicle, for releasing said locking bolt.

7. An automatic coupling comprising a central hollow buffer head formed with a curved seat at its lower side, a downwardly extending lug on said head, a coupling link trunnioned in said head, a disk hook trunnioned in said head, a longitudinally extending pivot bolt fixed in said lug, a crescent shaped locking bolt adapted to engage the said disk hook and prevent it turning when engaged by the coupling link of an adjacent vehicle, and a lever formed with a clearance hole for said pivot bolt and to which said locking bolt is fixed, the said locking bolt being adapted to bear against the curved seat at the underside of said head when said hook is engaged by the said locking bolt.

8. An automatic coupling comprising a central hollow buffer head formed with a curved seat at its lower side, a downwardly extending lug on said head, a coupling link trunnioned in said head, a disk hook trunnioned in said head, a longitudinally extending pivot bolt fixed in said lug, a crescent shaped locking bolt adapted to engage the said disk hook and prevent it turning when engaged by the coupling link of an adjacent vehicle, a lever formed with a clearance hole for said pivot bolt and to which said locking bolt is fixed, the said locking bolt being adapted to bear against the curved seat at the underside of said head when said hook is engaged by the said locking bolt, and means, operable from either side of the vehicle, for releasing said locking bolt.

9. An automatic coupling comprising a central hollow buffer head formed with a curved seat at its lower side, a downwardly extending lug on said head, a coupling link trunnioned in said head, a disk hook trunnioned in said head, a longitudinally extending pivot fixed in said lug, a crescent shaped locking bolt adapted to engage said disk hook and to bear against the curved seat of said head when in engagement with said disk hook, a lever formed with a slot for said pivot and to which said locking bolt is fixed, and a chain an intermediate part of which is fixed to said lever and the two ends of which are led to opposite sides of the vehicle.

Signed at London, England, this 4th day of November, 1912.

ALLISON DALRYMPLE SMITH.

Witnesses:
O. J. WORTH,
FRANCIS C. COOK.

Copies of this patent may be obtained for five cents each, by addressing the "Commissioner of Patents, Washington, D. C."